United States Patent
Mizuno et al.

(10) Patent No.: US 8,618,234 B2
(45) Date of Patent: Dec. 31, 2013

(54) SILICONE-BASED PRESSURE-SENSITIVE ADHESIVE COMPOSITION AND PRESSURE-SENSITIVE TAPE OR SHEET

(75) Inventors: Haruna Mizuno, Chiba (JP); Robert Alan Ekeland, Greer, SC (US); Seiji Hori, Chiba (JP); Takateru Yamada, Ichihara (JP)

(73) Assignees: Dow Corning Corporation, Midland, MI (US); Dow Corning Toray Company, Ltd., Chiyoda-ku, Tokyo (JP)

( * ) Notice: Subject to any disclaimer, the term of this patent is extended or adjusted under 35 U.S.C. 154(b) by 661 days.

(21) Appl. No.: 12/675,060

(22) PCT Filed: Aug. 22, 2008

(86) PCT No.: PCT/JP2008/065482
§ 371 (c)(1),
(2), (4) Date: Jan. 10, 2011

(87) PCT Pub. No.: WO2009/028638
PCT Pub. Date: Mar. 5, 2009

(65) Prior Publication Data
US 2011/0097579 A1    Apr. 28, 2011

(51) Int. Cl.
*C08G 77/08* (2006.01)

(52) U.S. Cl.
USPC ............ 528/15; 528/32; 428/447; 525/478

(58) Field of Classification Search
USPC ............ 528/15, 32; 525/478; 428/447
See application file for complete search history.

(56) References Cited

U.S. PATENT DOCUMENTS

| | | | |
|---|---|---|---|
| 4,774,297 A | 9/1988 | Murakami et al. | |
| 5,254,644 A | 10/1993 | Kobori et al. | |
| 5,272,225 A * | 12/1993 | Ogawa et al. | 525/477 |
| 6,268,300 B1 * | 7/2001 | Hernandez et al. | 442/168 |
| 6,806,339 B2 * | 10/2004 | Cray et al. | 528/15 |
| 2006/0128921 A1 * | 6/2006 | Cray et al. | 528/31 |
| 2012/0301644 A1 * | 11/2012 | Blackwood et al. | 428/35.2 |

FOREIGN PATENT DOCUMENTS

| | | | |
|---|---|---|---|
| JP | 63022886 A | | 1/1988 |
| JP | 4335083 A | | 11/1992 |
| JP | 2000-197823 A | | 7/2000 |
| JP | 2002-275450 A | | 9/2002 |
| JP | 2002-285129 A | | 10/2002 |
| JP | 2006-016555 A | | 1/2006 |
| JP | 2006-160923 A | | 6/2006 |

OTHER PUBLICATIONS

English language abstract for JP 63022886 extracted from espacenet.com database, dated Jun. 4, 2010, 8 pages.
English language abstract for JP 4335083 extracted from espacenet.com database, dated Jun. 4, 2010, 8 pages.
English language translation and abstract for JP 2000-197823 extracted from PAJ database, dated Jun. 4, 2010, 64 pages.
English language translation and abstract for JP 2002-275450 extracted from PAJ, database, dated Jun. 4, 2010, 32 pages.
English language translation and abstract for JP 2002-285129 extracted from PAJ database, dated Jun. 4, 2010, 36 pages.
English language translation and abstract for JP 2006-016555 extracted from PAJ database, dated Jun. 4, 2010, 63 pages.
English language translation and abstract for JP 2006-160923 extracted from PAJ database, dated Jun. 4, 2010, 60 pages.
PCT International Search Report for PCT/JP2008/065482, dated Jun. 3, 2009, 3 pages.

* cited by examiner

*Primary Examiner* — Margaret Moore
(74) *Attorney, Agent, or Firm* — Howard & Howard Attorneys PLLC

(57) ABSTRACT

Silicone-based pressure-sensitive adhesive composition comprising 100 parts (A) a branched organopolysiloxane having on molecular terminals at least two alkenyl groups and represented by $(R_3SiO_{1/2})_{4-p}(R^1R_2SiO_{1/2})_p(R_2SiO)_m(RR^1SiO)_n(SiO_{4/2})$, to 400 parts (B) an organopolysiloxane composed of $R^3R^2_2SiO_{1/2}$ units and $SiO_{4/2}$ units, (C) an organohydrogenpolysiloxane, and a catalytic quantity of (D) a platinum-type catalyst. Pressure-sensitive adhesive tape or sheet having an adhesive layer in the form of a cured layer of the aforementioned composition.

11 Claims, No Drawings

SILICONE-BASED PRESSURE-SENSITIVE ADHESIVE COMPOSITION AND PRESSURE-SENSITIVE TAPE OR SHEET

RELATED APPLICATIONS

This application is the National Stage of International Patent Application No. PCT/JP2008/065482, filed on Aug. 22, 2008, which claims priority to and all the advantages of Japanese Patent Application No. 2007-219032, filed on Aug. 24, 2007.

TECHNICAL FIELD

The present invention relates to a silicone-based pressure-sensitive adhesive composition and to a pressure-sensitive tape or sheet having on its surface a cured layer of the aforementioned composition. More specifically, the present invention relates to a silicone-based pressure-sensitive adhesive composition capable of forming a pressure-sensitive adhesive layer, which, when applied onto the surface of an adherend such as a metal substrate, ceramic substrate, electronic-circuit board, etc. and exposed to high temperatures, does not leave visible traces of silicone components on the surface of the aforementioned adherend after peeling from the surface of the adherend. The present invention also relates to a pressure-sensitive adhesive tape or sheet, the surface of which is coated with a cured layer of the aforementioned composition.

BACKGROUND ART

As compared to acrylic-based or rubber-based pressure-sensitive adhesive compositions, silicone-based pressure-sensitive adhesive compositions are superior to the former in their electrical-insulation properties, resistance to heat, resistance to frost, and adhesion to various substrates. Therefore, the silicone-based pressure-sensitive adhesive compositions find application in the production of such goods as heat-resistant adhesive tapes, electrically insulating adhesive tapes, heat-seal tapes, masking tapes for metal plating, etc. In terms of mechanisms of curing, the silicone-based pressure-sensitive adhesive compositions can be divided into compositions curable by an addition reaction, condensation reaction, or with the use of peroxide, of which the silicone-based pressure-sensitive adhesive compositions curable by an addition reaction find more common application since they can be cured by merely retaining them at room temperature or by heating for acceleration of curing. Another advantage of these compositions is that they do not form by-products.

Japanese Unexamined Patent Application Publication (hereinafter referred to as JP Kokai) S63-22886 (Patent Reference 1) discloses a pressure-sensitive adhesive agent (1) comprising (A1) a diorganopolysiloxane having both molecular terminals capped with alkenyl groups (viscosity of $5 \times 10^5$ cP or higher), (B1) an organopolysiloxane resin composed of $R_3SiO_{1/2}$ units (where R is an alkyl, alkenyl, or a hydroxyl group) and $SiO_{4/2}$ units; an (C1) organopolysiloxane having in one molecule at least two silicon-bonded hydrogen atoms {with 1 to 20 silicon-bonded hydrogen atoms per one alkenyl group of component (A1)}, (D1) a platinum-type catalyst, and (E1) an organic solvent, as an addition-reaction-curable silicone-based pressure-sensitive adhesive composition.

However, when adhesive tapes having cured layers formed from silicone-based pressure-sensitive adhesive compositions, especially those which are used for adhering in the field of electrical and electronic materials that require high heat-resistant properties, they occasionally peel from an adherend at high temperatures, and residual adhesives occasionally remain on the surface of the adherend. It was proposed in Patent References 2 to 4 to solve this problem with silicone-based pressure-sensitive adhesive compositions of the aforementioned type that maintain a strong adhesive force and leave a reduced amount of residual adhesives on the surface of an adherend.

JP Kokai H04-335083 (Patent Reference 2) discloses a silicone-based pressure-sensitive adhesive composition (2) which comprises (A2) a silanol-capped diorganopolysiloxane gum or a diorganopolysiloxane gum having vinyl groups on molecular terminals or in side chains, (B2) an MQ resin, (C2) an organohydrogenpolysiloxane, (D2) a platinum-type catalyst, and (E2) a diorganopolysiloxane having a plurality of vinyl groups in both molecular terminals and in side chains.

JP Kokai 2006-16555 (Patent Reference 3) discloses a silicone-based pressure-sensitive adhesive agent (3) that consists of at least the following components: (A3) a mixture of (a) a crude rubber-like organopolysiloxane containing on average one or more alkenyl groups in one molecule and (b) an organopolysiloxane resin consisting substantially of $R^1_3SiO_{1/2}$ units and $SiO_{4/2}$ units or partial condensation reaction product thereof; (B3) an organopolysiloxane containing in one molecule on average two or more silicon-bonded hydrogen atoms; (C3) a phenol-based antioxidant and/or a phenol-modified organosiloxane; (D3) an aromatic amine-based antioxidant and/or an aromatic amine-modified organosiloxane; and (E3) a platinum-based catalyst.

JP Kokai 2002-275450 (Patent Reference 4) discloses a silicone-based pressure-sensitive adhesive composition (4) which comprises a cross-linked product of compounds comprising a silicone rubber and a silicone resin as main components and is characterized by the fact that the gel fraction of the silicone-based pressure-sensitive adhesive composition rises to the range of from 5 to 55 wt. % when the adhesive composition is maintained at 200° C. for 24 hours.

The aforementioned silicone-based pressure-sensitive adhesive compositions (2) to (4) can satisfy both of a high pressure-sensitive force or adhesive force at high temperatures and a reduced amount of residual adhesives on the surface of an adherend. In the recent years, however, while adhesion force at a high level is not necessarily required, after an adhesive tape adhered on the surface of an adherend has been peeled after exposed to high temperatures, a process to wash the adherend is occasionally omitted in a part of the field of electronic and electrical devices.

No residual adhesive and a reduced amount of residual silicone components remaining on the adherend are required in such cases. In other words, when pressure-sensitive adhesive tapes or sheets are used as heat-treatment masking tapes in such processes as solder reflow on electronic circuit boards, non-migration type pressure-sensitive adhesive agents, that leave on the surface traces of the residual silicone components so small that they are practically invisible and can omit a process to wash said adherend with a solvent, are required.

In general, pressure-sensitive adhesive tapes or sheets that have silicone-based pressure-sensitive adhesive layers formed by curing the silicone-based pressure-sensitive adhesive compositions of the type disclosed in aforementioned Patent References 2 to 4 make it possible to reduce residual adhesives left on the surfaces from which they are peeled, even if such tapes experienced long-term exposure to high temperatures in the state of adhesion to adherends. Nevertheless, there are problems such that surfaces of various substrates either change their color, or residues of the silicone components are still visually observed on the surfaces of various substrates.

JP Kokai 2002-285129 (Patent Reference 5) discloses a solvent-saving or solventless pressure-sensitive adhesive composition (5) comprising (A5) an alkenyl-containing diorganopolysiloxane; (B5) an organopolysiloxane resin; (C5) a linear-chain organohydrogenpolysiloxane having hydrosilyl groups only in a part of the side chains, or a mixture of the aforementioned organohydrogenpolysiloxane with an organohydrogenpolysiloxane that has hydrosilyl groups in the side chains; (D5) a platinum-type catalyst; and (E5) a solvent (which may not be included).

JP Kokai 2006-160923 (Patent Reference 6) discloses a solvent-free silicone-based adhesive composition comprising: (A6) a polydiorganosiloxane that contains an organic group with at least two alkenyl groups in one molecule; (B6) a polyorganohydrosiloxane having at least two SiH groups in one molecule; (C6) a polyorganosiloxane that contains $R^1{}_3SiO_{0.5}$ units (where $R^1$ is a monovalent hydrocarbon group with 1 to 10 carbon atoms) and $SiO_2$ units, where the mole ratio of the first-mentioned units to the second-mentioned units is in the range of 0.6 to 1.7; and (D6) a platinum-type catalyst. Component (A6) in claim 3 is a polyorganosiloxane represented by the compositional formula:

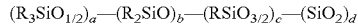

(wherein R is the same or different $C_1$ to $C_{10}$ hydrocarbon group at least two of which are alkenyl groups, a is 2 or more, b is 3 or more, c is 0 or more, d is 0 or more, 1≤c+d, a+b+c+d≤400) with a viscosity of 5~1,000 mPa·s at 25° C.

Polyorganosiloxane represented by the compositional formulae: $(XR_2SiO_{1/2})_a$—$(R_2SiO)_b$—$(RSiO_{3/2})_c$—$(SiO_2)_d$ and $(XR_2SiO_{1/2})_a$—$(R_2SiO)_b$—$(RSiO_{3/2})_c$ (wherein X is an alkenyl-containing organic group, R, a, b, c, and d are the same as aforementioned) are written in paragraph [0019].

The silicone-based pressure-sensitive composition (5) of JP Kokai 2002-285129 (Patent Reference 5) is characterized by excellent adhesive properties, while the solvent-free silicone-based adhesive composition (6) of JP Kokai 2006-160923(Patent Reference 6) has good re-peelability and adjusted adhesive force. However, when pressure-sensitive adhesive tapes or sheets with the adhesive layer in the form of a cured layer of the aforementioned compositions are exposed to temperatures higher than 230° C., and in particular, higher than 245° C. for a long-term in a state of adhesion to adherends, and then peeled from the surfaces of the adherends, there are problems such that residual adhesives and residual silicone components are visually observed on the surfaces of the adherends.

SUMMARY OF THE INVENTION

The above problems are solved by the present invention. It is an object of the present invention to provide a silicone-based pressure-sensitive adhesive composition, which, when used as a pressure-sensitive adhesive layer of a pressure-sensitive tape or sheet or adhesive layer of an adhesive tape or sheet (hereinafter "pressure-sensitive adhesive tape or sheet" and "adhesive tape or sheet" are collectively referred to as "pressure-sensitive tape or sheet"; "pressure-sensitive adhesive layer" and "adhesive layer" are collectively referred to as "pressure-sensitive adhesive layer") develops excellent force of pressure-sensitive adhesion or force of adhesion (hereinafter "force of pressure-sensitive adhesion" and "force of adhesion" are collectively referred to as "pressure-sensitive adhesion force") to an adherend such as a metal substrate, ceramic substrate, an electronic circuit board, or the like, and, does not leave on the surface of the adherend any residual adhesive and visible residue of silicone components when peeled from the surface of the adherend after exposure in an adhered state to a temperature which is equal to or greater than 230° C., and even equal to or greater than 245° C. It is another object of the present invention to provide a pressure-sensitive tape or sheet with a pressure-sensitive adhesive layer comprising the aforementioned silicone-based pressure-sensitive adhesive composition.

The present invention relates to a silicone-based pressure-sensitive adhesive composition comprising:

100 parts by weight of (A) a branched organopolysiloxane having on average at least two alkenyl groups on molecular terminals and represented by the following molecular formula (1):

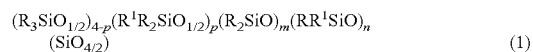

(wherein R designates a monovalent hydrocarbon group or a monovalent halogenated hydrocarbon group which is free of unsaturated aliphatic bonds and has 1 to 10 carbon atoms; $R^1$ designates an alkenyl group having 2 to 10 carbon atoms; "p" is a number which on average is in the range of 2 to 4; "m" is a number which on average is in the range of 1,500 to 10,000; "n" is a number which on average is equal to or greater than 0; and m>n, and (m+n) on average is in the range of 1,500 to 10,000);

10 to 400 parts by weight of (B) an organopolysiloxane resin composed of $R^3R^2{}_2SiO_{1/2}$ units (where $R^2$ designates an alkyl group with 1 to 10 carbon atoms, $R^3$ designates an alkyl group with 1 to 10 carbon atoms, an alkenyl group with 2 to 10 carbon atoms, an aryl group with 6 to 10 carbon atoms or a hydroxyl group) and $SiO_{4/2}$ units, where the mole ratio of the $R^3R^2{}_2SiO_{1/2}$ units to the $SiO_{4/2}$ units ranges from 0.6 to 1.7;

(C) an organohydrogenpolysiloxane having in one molecule two or more silicon-bonded hydrogen atoms, which is used in an amount sufficient to provide a mole ratio of silicon-bonded hydrogen atoms of this component to alkenyl groups contained in components (A) and (B) in the range of 1.0 to 60; and a catalytic quantity of (D) a platinum-type catalyst; and a pressure-sensitive adhesive tape or a sheet comprising a tape or sheet substrate and a pressure-sensitive adhesive layer in the form of a cured body of the silicone-based pressure-sensitive adhesive composition formed on the surface of the aforementioned tape or sheet substrate.

DISCLOSURE OF THE INVENTION

The above object is achieved by the present invention that provides the following:

[1] A silicone-based pressure-sensitive adhesive composition comprising:

100 parts by weight of (A) a branched organopolysiloxane having on average at least two alkenyl groups on molecular terminals and represented by the following molecular formula (1):

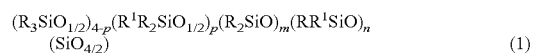

(wherein R designates a monovalent hydrocarbon group or a monovalent halogenated-hydrocarbon group which is free of unsaturated aliphatic bonds and has 1 to 10 carbon atoms; $R^1$ designates an alkenyl group having 2 to 10 carbon atoms; "p" is a number which on average is in the range of 2 to 4; "m" is a number which on average is in the range of 1,500 to 10,000;

"n" is a number which on average is equal to or greater than 0; and m>n, and (m+n) on average is in the range of 1,500 to 10,000);

10 to 400 parts by weight of (B) an organopolysiloxane resin composed of $R^3R^2_2SiO_{1/2}$ units (where $R^2$ designates an alkyl group with 1 to 10 carbon atoms, $R^3$ designates an alkyl group with 1 to 10 carbon atoms, an alkenyl group with 2 to 10 carbon atoms, an aryl group with 6 to 10 carbon atoms or a hydroxyl group) and $SiO_{4/2}$ units, where the mole ratio of the $R^3R^2_2SiO_{1/2}$ units to the $SiO_{4/2}$ units ranges from 0.6 to 1.7;

(C) an organohydrogenpolysiloxane having in one molecule two or more silicon-bonded hydrogen atoms, which is used in an amount sufficient to provide a mole ratio of silicon-bonded hydrogen atoms of this component to alkenyl groups contained in components (A) and (B) in the range of 1.0 to 60; and a catalytic quantity of (D) a platinum-type catalyst.

[2] The silicone-based pressure-sensitive adhesive composition according to Item [1], wherein "n" and "m" in the formula (1) of component (A) satisfy the following condition: 0≤n/(m+n)≤0.03.

[2-1] The silicone-based pressure-sensitive adhesive composition according to Items [1] or [2], wherein "p" in the formula (1) of component (A) on average is 3 to 4.

[2-2] The silicone-based pressure-sensitive adhesive composition according to Items [1], [2], or [2-1], wherein "m" in the formula (1) of component (A) ranges on average from 3,000 to 6,000.

[3] The silicone-based pressure-sensitive adhesive composition according to Items [1], wherein molecular formula (1) of component (A) is represented by the following formula (2):

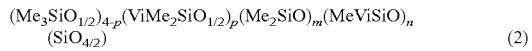

(wherein Me designates a methyl group; Vi designates a vinyl group; "p" is a number which on average is in the range of 2 to 4; "m" is a number which on average is in the range of 1,500 to 10,000; "n" is a number which on average is equal to or greater than 0; and m>n, and (m+n) on average is in the range of 1,500 to 10,000); $R^3R^22SiO_{1/2}$ units of component (B) are $Me_3SiO_{1/2}$ units; and component (C) is a methylhydrogenpolysiloxane.

[3-1] The silicone-based pressure-sensitive adhesive composition according to Item [3], wherein "n" and "m" in the formula (2) of component (A) satisfy the following condition: 0≤n/(m+n)≤0.03.

[3-2] The silicone-based pressure-sensitive adhesive composition according to Items [3] or [3-1], wherein "p" in the formula (1) of component (A) on average is 3 to 4.

[3-3] The silicone-based pressure-sensitive adhesive composition according to Items [3], [3-1], or [3-2], wherein "m" in the formula (1) of component (A) ranges on average from 3,000 to 6,000.

[4] The silicone-based pressure-sensitive adhesive composition of Item [3], wherein molecular formula (2) of component (A) is represented by the following molecular formula (3):

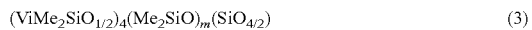

(where Me designates a methyl group, Vi designates a vinyl group, and "m" is a number which on average is in the range of 1,500 to 10,000).

[4-1] The silicone-based pressure-sensitive adhesive composition of Item [4], wherein "m" is a number on average in the range of 3,000 to 6,000.

The above object is further achieved by the following:

[5] The silicone-based pressure-sensitive adhesive composition of Item [1], further comprising (E) an organic solvent in a sufficient amount to provide the total weight of components (A) through (D) which is equal to or greater than 30 wt. % but less than 100 wt. % of the composition.

[6] The silicone-based pressure-sensitive adhesive composition according to Item [5], wherein "n" and "m" in the formula (1) of component (A) satisfy the following condition: 0≤n/(m+n)≤0.03.

[7] The silicone-based pressure-sensitive adhesive composition according to Item [5], wherein molecular formula (1) of component (A) is represented by the following formula (2):

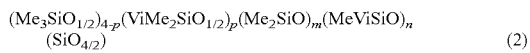

(wherein Me designates a methyl group; Vi designates a vinyl group; "p" is a number which on average is in the range of 2 to 4; "m" is a number which on average is in the range of 1,500 to 10,000; "n" is a number which on average is equal to or greater than 0; and m>n, and (m+n) on average is in the range of 1,500 to 10,000); $R^3R^22SiO_{1/2}$ units of component (B) are $Me_3SiO_{1/2}$ units; and component (C) is a methylhydrogenpolysiloxane.

[8] The silicone-based pressure-sensitive adhesive composition of Item [7], wherein molecular formula (2) of component (A) is represented by the following molecular formula (3):

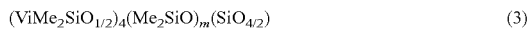

(where Me designates a methyl group, Vi designates a vinyl group, and "m" is a number which on average is in the range of 1,500 to 10,000).

[9] A pressure-sensitive adhesive tape or sheet comprising a tape or sheet substrate, and a pressure-sensitive adhesive layer in the form of a cured body of the silicone-based pressure-sensitive adhesive composition as claimed in Items [1], [2], [3], or [4] formed on the surface of the aforementioned tape or sheet substrate.

[9-1] A pressure-sensitive adhesive tape or sheet comprising a tape or sheet substrate and a pressure-sensitive adhesive layer in the form of a cured body of a silicone-based pressure-sensitive adhesive composition according to Items [2-1], [2-2] [3-1], [3-2], [3-3], or [4-1] formed on the surface of the aforementioned tape or sheet substrate.

When the silicone-based pressure-sensitive adhesive composition of the present invention is used as a pressure-sensitive adhesive layer of a pressure-sensitive adhesive tape or sheet, it demonstrates excellent adhesion to an adherend. When the pressure-sensitive tape or sheet having a pressure-sensitive adhesive layer in the form of a cured body of the silicone-based pressure-sensitive adhesive composition of the present invention is peeled from the surface of an adherend, such as a metal substrate, ceramic substrate, an electronic circuit board, or the like, after exposure in an adhered state to a temperature which is equal to or greater than 230° C., and even equal to or greater than 245° C., any residual adhesive does not remain and any visible residue of silicone components is not observed on the surface of the adherend. Therefore, there is no need for cleaning the surface of the adherend after peeling of the pressure-sensitive adhesive tape or sheet. In view of the above, the silicone-based pressure-sensitive adhesive composition of the present invention is suitable for forming a pressure-sensitive adhesive layer of masking tapes used in solder-reflow processes on electronic circuit boards.

BEST MODE FOR CARRYING OUT THE INVENTION

The silicone-based pressure-sensitive adhesive composition of the present invention will be explained at first in more details.
The silicone-based pressure-sensitive adhesive composition of the present invention comprises:

100 parts by weight of (A) a branched organopolysiloxane having on average at least two alkenyl groups on molecular terminals and represented by the following molecular formula (1):

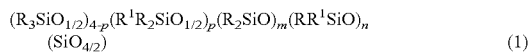

(wherein R designates a monovalent hydrocarbon group or a monovalent halogenated hydrocarbon group which is free of unsaturated aliphatic bonds and has 1 to 10 carbon atoms; $R^1$ designates an alkenyl group having 2 to 10 carbon atoms; "p" is a number which on average is in the range of 2 to 4; "m" is a number which on average is in the range of 1,500 to 10,000; "n" is a number which on average is equal to or greater than 0; and m>n, and (m+n) on average is in the range of 1,500 to 10,000);

10 to 400 parts by weight of (B) an organopolysiloxane composed of $R^3R^2{}_2SiO_{1/2}$ units (where $R^2$ designates an alkyl group with 1 to 10 carbon atoms, $R^3$ designates an alkyl group with 1 to 10 carbon atoms, an alkenyl group with 2 to 10 carbon atoms, and a hydroxyl group, or an aryl group with 6 to 10 carbon atoms) and $SiO_{4/2}$ units, where a ratio of the $R^3R^2{}_2SiO_{1/2}$ units to $SiO_{4/2}$ units ranges from 0.6 to 1.7;

(C) an organohydrogenpolysiloxane having in one molecule two or more silicon-bonded hydrogen atoms, which is used in an amount sufficient to provide a mole ratio of silicon-bonded hydrogen atoms of this component to alkenyl groups contained in components (A) and (B) in the range of 1.0 to 60; and (D) a catalytic quantity of a platinum-type catalyst.

Component (A) represented by molecular formula (1) is a specific component of the silicone-based pressure-sensitive adhesive composition of the present invention, whose alkenyl groups $R^1$ participate in a hydrosilylation reaction with the silicon-bonded hydrogen atoms of component (C).

Component (A) comprises polymerization chains composed on average from 1,500 to 10,000 units of formula $R_2SiO$ or polymerization chains composed of units of formula $R_2SiO$ and units of formula $RR^1SiO$ (with total number of the both units on average in the range of 1,500 to 10,000) and $SiO_{4/2}$ units as branching points. The polymerization chains extend in four directions from $SiO_{4/2}$ units with bonding of $R_3SiO_{1/2}$ units, $R^1R_2SiO_{1/2}$ units, or $R_3SiO_{1/2}$ units and $R^1R_2SiO_{1/2}$ units to the terminals of the aforementioned polymerization chains.

In the polymerization chain composed of the units of formula $R_2SiO$ and units of formula $RR^1SiO$, the following conditions should be observed: m>n (i.e., the number of siloxane units which are free of alkenyl groups should exceed the number of siloxane units containing alkenyl groups); and (m+n) (i.e., the total number of the units of formula $R_2SiO$ and units of formula $RR^1SiO$) should on average be in the range of 1,500 to 10,000.

It is recommended that the appropriate branched organopolysiloxane be represented by the following molecular formulae:

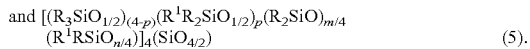

More preferable is the organopolysiloxane of the following formula (6):

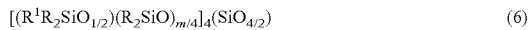

In fact, since the units of formula $R_3SiO_{1/2}$, the units of formula $R^1R_2SiO_{1/2}$, or the units of formula $R_3SiO_{1/2}$ and the units of formula $R^1R_2SiO_{1/2}$ may directly bond to the units of formula $SiO_{4/2}$, the organopolysiloxane may contain polymerization chains composed only of the units of formula $R_2SiO$, or may contain a mixture of two-directionally or three-directionally extended molecules with polymerization chains composed of the units of formula $R_2SiO$ and the units of formula $RR^1SiO$.

In the above formulae, R designates a monovalent hydrocarbon group with 1 to 10 carbon atoms, which is free of unsaturated aliphatic bonds, or a monovalent halogenated hydrocarbon group, which is free of unsaturated aliphatic bonds and has 1 to 10 carbon atoms; and $R^1$ designates an alkenyl group with 2 to 10 carbon atoms. The aforementioned monovalent hydrocarbon group which is free of unsaturated aliphatic bonds is exemplified by a methyl, ethyl, propyl, butyl, hexyl, or a similar alkyl group; a phenyl, tolyl, or a similar aryl group; or a benzyl, phenethyl, or a similar aralkyl group. The aforementioned monovalent halogenated hydrocarbon group which is free of unsaturated aliphatic bonds and has 1 to 10 carbon atoms is exemplified by a chloropropyl, trifluoropropyl, pentafluorobutyl, or a similar haloalkyl group. From the viewpoint of ease of manufacturing, the methyl group is preferable.

The alkenyl group with 2 to 10 carbon atoms represented by $R^1$ is exemplified by a vinyl, allyl, butenyl, or hexenyl group, of which the vinyl group is preferable from the viewpoint of ease of manufacturing.

Component (A) is cross-linked by causing a hydrosilylation reaction between silicon-bonded alkenyl groups of this component with silicon-bonded hydrogen atoms of component (C). In order to provide improved adhesion to an adherend and to prevents residual adhesives and transfer of silicone components to the surface of an adherend, at least two alkenyl groups are present on the terminal siloxane units. In other words, "p" in molecular formula (1) on average is in the range of 2 to 4, preferably on average is in the range of 3 to 4, and most preferably is 4.

In formula (1), the $R_3SiO_{1/2}$ units can be exemplified by $(Me)_3SiO_{1/2}$ unit, $(Me)_2PrSiO_{1/2}$ unit, $(Me)_2OcSiO_{1/2}$ unit, and $(Me)_2PhSiO_{1/2}$ unit.

The $R^1R_2SiO_{1/2}$ units can be exemplified by $Vi(Me)_2SiO_{1/2}$ unit, $He(Me)_2SiO_{1/2}$ unit, and $ViMePhSiO_{1/2}$ unit.

The $R_2SiO_{2/2}$ units can be exemplified by $(Me)_2SiO_{2/2}$ unit, $MePrSiO_{2/2}$ unit, $MeOcSiO_{2/2}$ unit, and $MePhSiO_{2/2}$ unit.

The $R^1RSiO_{2/2}$ units can be exemplified by $ViMeSiO_{2/2}$ unit and $HeMeSiO_{2/2}$ unit.

In these formulae, Me stands for methyl group, Pr stands for propyl group, Oc stands for octyl group, Vi stands for vinyl group, He stands for hexenyl group, and Ph stands for phenyl group.

At room temperature, component (A) may be in a state from highly viscous liquid to crude rubber (so-called gummy state), since the average value of (m+n), which in component (A) corresponds to the total number of siloxane units of the formula $R_2SiO$ and siloxane units of the formula $RR^1SiO$, is in the range of 1,500 to 10,000.

If (m+n) is less than 1,500, residual adhesives and silicone components transferred to an adherend are occasionally observed on the surface of the adherend when the pressure-sensitive tape or sheet having a pressure-sensitive adhesive layer in the form of a cured body of the silicone-based pressure-sensitive adhesive composition is peeled from the surface of an adherend, such as a metal substrate, ceramic substrate, an electronic circuit board, or the like, after exposure in an adhered state to a temperature which is equal to or greater than 230° C., and even equal to or greater than 245° C.

It is not easy to manufacture organopolysiloxanes with (m+n) on average exceeding 10,000. In view of the above, an average value of (m+n) is preferably in the range of 3,000 to 6,000. Component (A) with (m+n) in the range of 3,000 to 6,000 is in a crude-rubber state (gummy state) at ambient temperature.

An excessive number of units represented by formula $(RR^1SiO)$ leads to an extremely high value of the modulus of elasticity in a cured body of the silicone-based pressure-sensitive adhesive composition that contains such component (A), and in turn, will reduce the pressure-sensitive adhesive force to adherends. Therefore, it is preferable that values of "m" and "n" satisfy the following condition: $0 \leq n/(m+n) \leq 0.03$.

From the viewpoint of ease of the manufacture, it is recommended that component (A) comprises a branched methylvinylpolysiloxane of the following molecular formula (2):

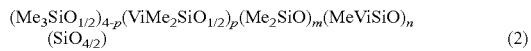

(wherein Me designates a methyl group; Vi designates a vinyl group; "p" is a number which on average is in the range of 2 to 4; "m" is a number which on average is in the range of 1,500 to 10,000; "n" is a number which on average is equal to or greater than 0; and m>n and (m+n) on average is in the range of 1,500 to 10,000).

For the same reasons as explained above, the average value of (m+n) is preferably on average in the range of 3,000 to 6,000, and the following condition should be observed: $0 \leq n/(m+n) \leq 0.03$.

Specifically preferable is a branched methylvinylpolysiloxane having the following molecular formula (3):

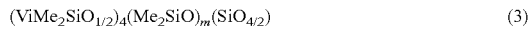

(where Me designates a methyl group, Vi designates a vinyl group, and "m" is a number on average in the range of 1,500 to 10,000). More preferable is a branched methylvinylpolysiloxane having the molecular formula (3) where "m" is a number on average in the range of 3,000 to 6,000.

Two or more components (A) of different types can be used in a combination.

Component (A) can be easily produced, for example, by means of the following procedure.

A reactor filled with gaseous nitrogen is loaded with 21.6 g of $[Vi(Me)_2SiO_{1/2}]_4SiO_{4/2}$ and 592.6 g of an octamethyl cyclotetrasiloxane. The contents are heated to 100° C. under a reduced pressure, whereby dissolved carbon dioxide is removed. Following this, the contents are heated to 150° C., combined with a linear polyaminophosphazenium hydroxide-type catalyst in a catalytic quantity (50 ppm), are stirred for 1 minute, are neutralized, and volatile components are removed from the contents to obtain a branched methylvinylpolysiloxane of the following molecular formula: $(ViMe_2SiO_{1/2})_4(Me_2SiO_{2/2})_{160}(SiO_{4/2})$. The aforementioned branched methylvinylpolysiloxane and the octamethylcyclotetrasiloxane are loaded into a reactor filled with gaseous nitrogen, and the dissolved carbon dioxide is removed by heating the contents at 100° C. under a reduced pressure. Following this, the contents are heated to 150° C., are combined with a linear polyaminophosphazenium hydroxide-type catalyst in a catalytic quantity, and are stirred for 1 minute to obtain the product.

A method of manufacturing the linear polyaminophosphazenium-hydroxide type catalyst of the following formula: $[Py_3-N-(P=NPy_2)_{1.8}-PPy_3]^+OH^-$ (where Py stands for pyrrolidone) is disclosed in Synthesis Example 2 of JP Kokai 2000-197823. "The method consists of placing 0.092 mole of $Cl_3PNPCl_2O$ and 0.092 mole of $(Cl_3PNPCl_3)^+(PCl_6)^-$ into a three-neck flask equipped with a stirrer, thermometer, and condenser, adding 1,2,4-trichlorobenzene to the contents, and heating the obtained mixture for 30 hours at 195° C. The obtained crude product is dissolved in tetrachloroethane; carbon tetrachloride is added to the resulting solution several times to generate white precipitates. The white precipitates are washed with petroleum ether and dried under a reduced pressure (65% yield). The obtained crystalline substance is dispersed in a mixture of distilled water and methanol (mixed in 1 to 1 ratio), and is converted into a polyaminophosphazenium hydroxide by passing through a basic (OH) anion-exchange resin. Following this, water and methanol are removed under a reduced pressure."

Mole ratios of siloxane units contained in the product of polymerization that comprises a branched methylvinylpolysiloxane can be determined by calculations based on the ratio of the starting siloxanes, results of NMR analysis, and quantitative analysis of the contained vinyl groups. The number of dimethylsiloxane units can be determined from the results of the NMR analysis.

The organopolysiloxane resin of component (B), which is composed of $R^3R^2_2SiO_{1/2}$ units (where $R^2$ designates an alkyl group with 1 to 10 carbon atoms, $R^3$ designates an alkyl group with 1 to 10 carbon atoms, an alkenyl group with 2 to 10 carbon atoms, a hydroxyl group, or an aryl group with 6 to 10 carbon atoms) and $SiO_{4/2}$ units and which has a ratio of the $R^3R^2_2SiO_{1/2}$ units to $SiO_{4/2}$ ranging from 0.6 to 1.7, is a compound that imparts pressure-sensitive adhesive properties to the silicone-based pressure-sensitive adhesive composition that contains components (A) and (B) and to a cured body of the aforementioned composition.

In the aforementioned siloxane units, $R^2$ can be exemplified by an alkyl group having 1 to 10 carbon atoms; $R^3$ designates an alkyl or an alkenyl group with 1 to 10 carbon atoms, or a hydroxyl group or an aryl group with 6 to 10 carbon atoms. The alkyl group can be exemplified by a methyl, ethyl, propyl, hexyl, or octyl group; an alkenyl group can be exemplified by a vinyl, allyl, butenyl, or hexenyl group. The aryl group can be exemplified by a phenyl or tolyl group. The $R^3R^2_2SiO_{1/2}$ units may be exemplified by the units of the following formulae: $Me_3SiO_{1/2}$, $Me_2OcSiO_{1/2}$, $Me_2ViSiO_{1/2}$, $Me_2PhSiO_{1/2}$, or $Me_2(HO)SiO_{1/2}$. In these formulae, Me stands for a methyl group, Oc stands for an octyl group, Vi stands for a vinyl group, and Ph stands for a phenyl group.

For better compatibility with preferred component (A), i.e., with component (A) represented by molecular formula (2) and molecular formula (3), it is recommended that in component (B) methyl groups constitute 95% or more of the total mole number of groups designated $R^2$ and $R^3$. The mole ratio of the $R^3R^2_2SiO_{1/2}$ units to $SiO_{4/2}$ units should be in the range 0.6 to 1.7, preferably 0.6 to 1.0.

Within the limits that do not adversely affect properties of the composition, in addition to $R^3R^2_2SiO_{1/2}$ units and $SiO_{4/2}$ units, component (B) may contain in an small amount (for example, 10 mole % or less) any or several of $R_2SiO_{2/2}$ units, $RR^1SiO_{2/2}$ units, $RSiO_{3/2}$ units, $R^1SiO_{3/2}$ units and siloxane units in which R or $R^1$ in these units is replaced with a hydroxyl group. R and $R^1$ are the same as the aforementioned ones. Compounds of different types that represent component (B) can be used in combination.

Component (B) should be used in an amount of 10 to 400 parts by weight, preferably, 25 to 150 parts by weight, per 100 parts by weight of component (A). If component (B) is used in an amount less than 10 parts by weight, the composition will not acquire sufficient adhesiveness since it will not develop a sufficient pressure-sensitive adhesive force relative to an adherend. If the content of component (B) exceeds 400 parts by weight, it will be difficult to uniformly mix it with component (A), whereby an adhesive tape or sheet having a pressure-sensitive adhesive layer in the form of a cured body of the silicone-based pressure sensitive composition will leave, after peeling from the adherend, some residue of component (B) on the surface of the adherend, especially when the adhesive tape or sheet has been exposed in an adhered state to a temperature 230° C. or more, and especially 245° C. or more.

Component (C) is an organohydrogenpolysiloxane that has in one molecule two or more silicon-bonded hydrogen atoms. This component has the function as a cross-linking agent for component (A) and component (B) having an alkenyl group: The silicon-bonded hydrogen atoms of this component undergo a hydrosilylation reaction with the alkenyl groups of component (A) and component (B) having an alkenyl group.

In order to provide the function of a cross-linking agent, component (C) should have in one molecule two or more silicon-bonded hydrogen atoms, and has preferably three or more silicon-bonded hydrogen atoms. There are no special restrictions with regard to the molecular structure of component (C) that may have a linear, partially branched, branched, or a cyclic molecular structure. There are no special restrictions with regard to bonding positions of the silicon-bonded hydrogen atoms, and the hydrogen atoms may be positioned at molecular terminals, in the side chains, or in both positions.

It is recommended that the content of the silicon-bonded hydrogen atoms be in the range of 0.1 to 1.6 wt. %, and preferably, 0.5 to 1.6 wt. %.

The silicon-bonded organic groups of component (C) can be exemplified by a methyl, ethyl, propyl, butyl, octyl, or similar alkyl group having 1 to 8 carbon atoms; phenyl, tolyl, or a similar aryl group; benzyl, phenethyl, or a similar aralkyl group; and chloropropyl, trifluoropropyl, or a similar haloalkyl group. It is recommended that alkyl groups having 1 to 8 carbon atom constitute 50 mole % or more of the total number of these groups. Among the aforementioned alkyl groups, the methyl group is preferable from the viewpoint of ease of manufacture and compatibility with components (A) and (B).

In order to facilitate mixing with other components, it is recommended that component (C) be liquid at room temperature. It is recommended that the viscosity of this component at 25° C. be in the range of 1 to 1,000 mPa·s, and preferably in the range of 5 to 500 mPa·s. If the viscosity is below 1 mPa·s, component (C) will easily evaporate from the silicone-based pressure-sensitive adhesive composition, and if the viscosity exceeds 1000 mPa·s, it is not easy to produce component (C).

The following are specific examples of the aforementioned component (C): a methylhydrogenpolysiloxane capped at both molecular terminals with trimethylsiloxy groups; a methylhydrogensiloxane•dimethylsiloxane copolymer capped at both molecular terminals with trimethylsiloxy groups; a methylhydrogensiloxane•dimethylsiloxane copolymer capped at both molecular terminals with dimethylhydrogensiloxy groups; a cyclic methylhydrogenoligosiloxane; a cyclic dimethylsiloxane•methylhydrogensiloxane copolymer; a tris(dimethylhydrogensiloxy)methylsilane: or a tetra(dimethylhydrogensiloxy)silane.

Among the above, the most preferable is the methylhydrogenpolysiloxane of the following molecular formula (7):

$$DMe_2SiO(Me_2SiO)_q(HMeSiO)_rSiMe_2D \qquad (7)$$

(where Me stands for a methyl group; D stands for a methyl group or a hydrogen atom; and "q" and "r" are numbers that satisfy the following conditions: $0.3 \le r/(q+r) \le 1$; $10 \le (q+r) \le 200$).

Two or more components (C) of different types can be used in combination.

Component (C) is used in an amount sufficient to provide a mole ratio of silicon-bonded hydrogen atoms of this component to alkenyl groups contained in components (A) and (B) in the range of (1:1) to (60:1); and preferably in the range of (10:1) to (40 to 1). If the above ratio is below (1:1), the composition will be insufficiently cured, and the adhesive tape or sheet that has an adhesive layer in the form of a cured body of the silicone-based pressure-sensitive adhesive composition will leave some residual adhesives on the surface of an adherend from which the adhesive tape or sheet is peeled after being exposed in an adhered state to a temperature not less than 230° C., and especially 245° C.

On the other hand, if the above ratio exceeds (60:1), a cured body of the silicone-based pressure-sensitive adhesive composition will have too high modulus of elasticity and too low pressure-sensitive adhesive force, and some visible residue of component (C) will remain on the surface of an adherend from which the adhesive tape or sheet is peeled after being exposed in an adhered state to a temperature not less than 230° C., and especially 245° C.

(D) a platinum-type catalyst is the component that accelerates hydrosilylation reaction between alkenyl groups of components (A) and (B) and silicon-bonded hydrogen atoms of component (C).

Preferable platinum-type catalysts can be specifically exemplified by chloroplatinic acid, alcohol-modified chloroplatinic acid, olefin complex of chloroplatinic acid, ketone complex of chloroplatinic acid, vinylsiloxane complex of chloroplatinic acid, platinum tetrachloride, fine platinum powder, solid platinum on a carrier such as alumina or silica, platinum black, olefin complex of platinum, alkenylsiloxane complex of platinum, carbonyl complex of platinum, or a finely powdered methylmethacrylate, polycarbonate, polystyrene, silicone, or a similar thermoplastic organic resin containing the aforementioned platinum-type catalyst. Of these, most preferable are the following compounds: divinyltetramethyl disiloxane complex of chloroplatinic acid, tetramethyltetravinyl cyclotetrasiloxane complex of chloroplatinic acid, divinyltetramethyl disiloxane complex of platinum, tetramethyltetravinyl cyclotetrasiloxane complex of platinum, or a similar alkenylsiloxane complex of platinum.

The aforementioned platinum-type catalyst is included in the composition in so-called catalytic quantity. More specifically, in terms of weight units, the content of metallic platinum should be in the range of 1 to 1,000 ppm, and preferably 5 to 200 ppm, of the total weight of components (A), (B), and (C). If the platinum catalyst is included in an amount of metallic platinum less that 1 ppm, curing of the obtained silicone-based pressure-sensitive adhesive composition will proceed very slowly. If, on the other hand, the platinum-type catalyst is included in an amount of metallic platinum exceeding 1,000 ppm, the obtained silicone-based pressure-sensitive adhesive composition might have problems such as discoloration.

Within the limits that are not in contradiction with the objects of the present invention, in addition to components (A) through (D), the composition may contain other components, such as an organic solvent (E), a hydrosilylation-reaction inhibitor (F), or other conventional additives such as adhesion improvers, heat-resistant agents, pigments, etc.

Organic solvent (E) reduces viscosity of the silicone-based pressure-sensitive adhesive composition that comprises components (A) through (D) and facilitates formation of thin coatings. Examples of the solvent include toluene, xylene, hexene, heptane, acetone, methylethylketone, and methylisobutylketone. It is recommended that organic solvent (E) be added to the silicone-based pressure-sensitive adhesive composition in a sufficient amount to provide the total weight of the components (A) through (D) less than 100 wt. % but no less than 30 wt. % of the composition. Since component (A) has a solution viscosity lower than the solution viscosity of a linear-chained diorganopolysiloxane gum, the silicone-based pressure-sensitive adhesive composition may have a low viscosity, even at relative high concentrations.

Hydrosilylation-reaction inhibitor (F) inhibits the cross-linking reaction between component (A) and component (C) or between components (A), (B), and (C) when component (B) contains alkenyl groups. This component is included in the composition for extending the shelf life and storage stability of the composition. In view of the above properties, this component may be considered nearly indispensable.

Component (F) can be exemplified by the following compounds: 3-methyl-1-butyn-3-ol, 3,5-dimethyl-1-hexyn-3-ol, 3-methyl-1-pentin-3-ol, 1-ethynyl-1-cyclohexanol, phenylbutynol, or a similar alkine alcohol; -3-methyl-3-penten-1-yne, 3,5-dimethyl-1-hexen-3-yne, or a similar enyne compound; 1,3,5,7-tetramethyl-1,3,5,7-tetravinylcyclotetrasiloxane, 1,3,5,7-tetramethyl-1,3,5,7-tetrahexenylcyclotetrasiloxane, or a similar methylalkenylsiloxane compound; or benzotriazole.

The hydrosilylation-reaction inhibitor is included in a sufficient amount that at room temperature extends shelf life and improves storage stability of the silicone-based pressure-sensitive adhesive composition of the present invention. Normally, the inhibitor included in the amount of 0.001 to 5 parts by weight, preferably 0.01 to 2 parts by weight per 100 parts by weight of component (A), but the most optimized amount can be selected with reference to such factors as type of the inhibitor, properties of the platinum-type catalyst, amount of alkenyl groups in components (A) and (B), and amount of silicon-bonded hydrogen atoms in component (C).

The adhesion improver is included in the composition of the present invention for improving adhesion of the composition to a substrate when the composition is cured while being in contact with the substrate. The adhesion improver is an efficient component for those adhesive tapes or sheets with pressure-sensitive layers in the form of cured bodies of the silicone-based pressure-sensitive adhesive composition of the present invention that do not require re-peeling. The adhesion improver can be exemplified by vinyl triethoxysilane, allyl trimethoxysilane, allyl triethoxysilane, 3-glycidoxypropyl trimethoxysilane, 3-methacryloxypropyl trimethoxysilane, or similar organic functional alkoxysilane compounds or their siloxane derivatives.

The silicone-based pressure-sensitive adhesive composition of the present invention is prepared by uniformly mixing aforementioned components (A) through (D), components (A) through (E), components (A) through (D) with component (F), or components (A) through (F). If necessary, the prepared mixture is combined and mixed with other arbitrary components. Mixing can be carried out at ambient temperature with the use of various stirrers or mixers, but if necessary, mixing can be carried out with heating, provided that mixing is not accompanied by curing.

There are no special restrictions with regard to the sequence in which various components can be added, provided that mixing is not accompanied by curing. If the composition is not used immediately after mixing, the composition may be stored in the form of premixed combinations in several containers so as to avoid storage of components (C) and (D) in the same container, and all the components in the several containers may be mixed altogether just before using.

The silicone-based pressure-sensitive adhesive composition of the present invention is applied onto a tape-like or a sheet-like substrate and is cured by retaining at room temperature or by heating to a temperature ranging from 50° C. to 200° C., whereby a pressure-sensitive adhesive layer is formed on the aforementioned substrate. The substrate may be made from different materials such as single paperboard, corrugated paperboard, clay-coated paper, polyolefin-laminated paper, especially polyethylene-laminated paper, synthetic-resin film, natural-fiber web, synthetic-fiber web, artificial leather, or metal foil. The most preferable substrate is a synthetic film, such as polyimide, polyethylene, polypropylene, polystyrene, polyvinylchloride, polycarbonate, polyethylene terephthalate, or Nylon. When heat-resistant properties are essential, it is preferable to use a substrate in the form of a film made from polyimide, polyether-ether-ketone (PEEK), polyethylene naphthalate (PEN), liquid-crystal polyallylate, polyamidoimide (PAI), polyether sulfone (PES), or a similar heat-resistant synthetic resin.

The pressure-sensitive adhesive tape or sheet of the present invention comprises a tape or sheet substrate and a silicone-based pressure-sensitive adhesive layer thereon comprising a cured body of the silicone-based pressure-sensitive adhesive composition of the present invention. There are no special limitations with regard to the thickness of the silicone-based pressure-sensitive adhesive layer, but in general the layer thickness is in the range of 10 to 100 µm. The silicone-based pressure-sensitive adhesive layer is preferably covered with an easily peelable coating film.

The pressure-sensitive adhesive tape or sheet of the present invention is produced by applying the pressure-sensitive adhesive composition of the present invention onto the tape-like or sheet-like substrate, and then curing the applied composition by retaining at room temperature or by heating at a temperature in the range of 50° C. to 200° C., whereby a pressure-sensitive layer is formed on the surface of the substrate. The composition can be applied onto the substrate by such methods as gravure coating, offset coating, offset gravure coating, roller coating, reverse-roller coating, air-knife coating, curtain coating, or a comma-coating method. It is recommended to cure the pressure-sensitive adhesive composition on the tape-like or sheet-like substrate by heating, preferably at a temperature in the range of 80° C. to 200° C.

EXAMPLES

The present invention will be further described more specifically by way of practical and comparative examples, which, however, should not be construed as limiting the scope of the present invention. In the following examples, SiH/SiVi designates the mole ratio of silicon-bonded hydrogen atoms contained in a dimethylsiloxane•methylhydrogensiloxane copolymer capped at both molecular terminals with trimethylsiloxy groups to silicon-bonded vinyl groups contained in a branched methylvinylsiloxane, a dimethylpolysiloxane gum capped at both molecular terminals with dimethylvinylsiloxy groups, or a methylvinylsiloxane•dimethylsiloxane copolymer gum capped at both molecular terminals with dimethylvinylsiloxy groups.

In the subsequent synthetic, practical, and comparative examples, Me stands for methyl, and Vi stands for vinyl. The branched methylvinylpolysiloxane was analyzed and measured by means of below-described procedures. The adhesive force developed by the silicone-based pressure-sensitive adhesive composition, a residual adhesive-remaining property, and silicone-transfer property after exposure to high temperatures were evaluated by means of below-described procedures.

[NMR Analysis]

An average molecular formula of the branched methylvinylpolysiloxanes mentioned in subsequent synthesis examples was determined based on the following $^{29}$Si-NMR analysis:

NMR apparatus: Fourier Transform Nuclear Magnetic Resonance Spectrometer JEOL (JEOL is a registered trademark of JEOL Ltd. Japan) JNM-EX400 (the product of JEOL Ltd.)

Determination method: Integrated values of the peaks were calculated based on signals derived from $^{29}$Si for various siloxane units shown below. An average molecular formula was identified by finding ratios of the integrated signal values obtained for various siloxane units (M units, D units, and Q units) and then finding siloxane-unit ratios based on the determined signal ratios.

| Siloxane units | Positions of signals derived from $^{29}$Si |
|---|---|
| $ViMe_2SiO_{1/2}$ units | close to −3.71 ppm |
| $ViMeSiO_{2/2}$ units | close to −35.4 ppm |
| $Me_2SiO_{2/2}$ units (D) | from −20.4 to −22.2 ppm |
| $SiO_{4/2}$ units (Q) | from −107.5 to −109.1 ppm |

[Viscosity]

Viscosity of a toluene solution that contains 20 wt. % of the branched methylvinylpolysiloxane and viscosity of the silicone-based pressure-sensitive adhesive composition were measured at 25° C. by a digital-indicator type viscosimeter (the product of Shibaura System Co., Ltd.; Vismetron VDA2) with the use of rotors and rotation speeds shown in Table 1 below.

TABLE 1

| Viscosity (mPa · s) | Rotor No. | Rotation speed (rpm) |
|---|---|---|
| 10 to 100 | 1 | 60 |
| 100 to 1,000 | 1 | 6 |
| 1,000 to 10,000 | 2 | 3 |
| 10,000 to 100,000 | 4 | 6 |

[Adhesive Force]

The silicone-based pressure-sensitive adhesive composition was applied onto a polyimide (PI) film for forming a pressure-sensitive adhesive layer which after curing has a thickness of 15 μm, and then a pressure-sensitive adhesive sheet was produced by heating the coated film for 2 min. at 180° C. The obtained pressure-sensitive adhesive sheet was pasted onto a peelable polyethylene terephthalate film by means of a laminator, and then the product was aged for 1 day in an oven at 50° C. After cooling to room temperature, pressure-sensitive adhesive tapes were formed by cutting the obtained sheet into 20-mm-wide strips. Each tape was peeled from the peelable polyethylene terephthalate films and adhered under pressure of 2 kgf developed by rubber rollers to an adherend in the form of a mirror-surface stainless steel plate (SUS304). After retention for 30 min. at room temperature, the adhesion force was measured by pulling the pressure-sensitive adhesive tape off from the adherend at an angle of 180° relative to the surface of the adherend with the use of a tensile tester at a constant speed of 300 mm/min.

[Residual Adhesive-Remaining Property and Silicone-Transfer Property After Exposure to High Temperatures]

The silicone-based pressure-sensitive adhesive composition was applied onto a polyimide (PI) film for forming a pressure-sensitive adhesive layer, which after curing has a thickness of 15 μm, and then a pressure-sensitive adhesive sheet was produced by heating the coated film for 2 min. at 180° C. The obtained pressure-sensitive adhesive sheet was pasted onto a peelable polyethylene terephthalate film by means of a laminator, and then the product was aged for 1 day in an oven at 50° C. After cooling to room temperature, pressure-sensitive adhesive tapes were formed by cutting the obtained sheet into 20-mm-wide strips. Each tape was peeled off from the respective peelable polyethylene terephthalate film and adhered under pressure of 2 kgf developed by rubber rollers to an adherend in the form of a mirror-surface stainless steel plate (SUS304) or a substrate formed by plating gold onto a copper-coated glass epoxy. Following this, each adherend coated with a pressure-sensitive adhesive tape was aged for 10 min, in an oven at 250° C., then removed from the oven and left intact for 30 min. at room temperature.

After the aforementioned retention, the pressure-sensitive adhesive tape was peeled off from the adherend by pulling it at an angle of 180° relative to the surface of the adherend with the use of a tensile tester at a constant speed of 300 m/min, and the residual adhesives on the surface of the adherend and silicone-transfer to the surface of the adherend were evaluated by visual observation. The residual adhesives were residues of a cured silicone-based pressure-sensitive adhesive composition that, in some degree, bulged over the the surface of the adherend. The silicone-transfer was whity dull deposits and tarnishes which were distinctly different from the residual adhesives.

Synthesis Example 1

A reactor filled with gaseous nitrogen was loaded with 21.6 g of $[Vi(Me)_2SiO_{1/2}]_4 SiO_{4/2}$ and 592.6 g of an octamethyl cyclotetrasiloxane, and the dissolved carbon dioxide was removed by heating to 100° C. and reducing the pressure. Following this, the contents were heated to 150° C. and combined with a catalytic quantity (50 ppm) of a linear polyaminophosphazenium hydroxide-type catalyst $[Py_3$-N—$(P=NPy_2)_{1.8}$-$PPy_3]^+OH^-$ (where Py stands for pyrrolidine). The contents were stirred for 1 min. and were neutralized, volatile components were removed, the remaining contents were cooled to room temperature to obtain a colorless transparent liquid. Viscosity of this liquid was 46 mPa·s, and the content of vinyl groups was 0.90 wt. %. Results of NMR analysis showed that the obtained liquid comprised a branched methylvinylpolysiloxane represented by the following average molecular formula (8):

$$(ViMe_2SiO_{1/2})_4(Me_2SiO_{2/2})_{160}(SiO_{4/2}) \tag{8}$$

Synthesis Example 2

A 5-liter separable flask equipped with a stirrer, thermometer, and a filling mouth was filled with the following components: 145 g of a liquid methylvinylpolysiloxane represented by the following average molecular formula (8): $[ViMe_2SiO_{1/2}]_4(Me_2SiO)_{160}(SiO_{4/2})$ synthesized in Synthesis Example 1; 3354 g of an octamethyl cyclotetrasiloxane; and 0.175 g (50 ppm) of a linear polyaminophosphazenium hydroxide-type catalyst: $[Py_3\text{-}N\text{---}(P\text{=}NPy_2)_{1.8}\text{-}PPy_3]^+OH^-$ (where Py stands for pyrrolidine). The contents were stirred for 3 hours at 150° C. Following this, the contents were cooled to 100° C., then heated again to 150° C., subjected to stripping under a reduced pressure, and cooled to room temperature to obtain a colorless transparent and sticky crude rubberlike substance. Viscosity of a 20 wt. % toluene solution of this substance was 193 mPa·s, and the content of vinyl groups was 0.04 wt. %. Results of NMR analysis showed that the obtained crude resin substance comprised a branched methylvinylpolysiloxane represented by the following average molecular formula (9):

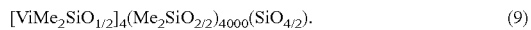

$$[ViMe_2SiO_{1/2}]_4(Me_2SiO_{2/2})_{4000}(SiO_{4/2}). \tag{9}$$

Synthesis Example 3

A 5-liter separable flask equipped with a stirrer, thermometer, and a filling mouth was filled with the following components: 145 g of a liquid methylvinylpolysiloxane represented by the following average molecular formula (8): $[ViMe_2SiO_{1/2}]_4(Me_2SiO)_{160}(SiO_{4/2})$ synthesized in Synthesis Example 1; 3354 g of an octamethyl cyclotetrasiloxane; 4.3 g of tetramethyltetravinyl cyclotetrasiloxane; and 0.175 g (50 ppm) of a linear polyaminophosphazenium hydroxide-type catalyst: $[Py_3\text{-}N\text{---}(P\text{=}NPy_2)_{1.8}\text{-}PPy_3]^+OH^-$ (where Py stands for pyrrolidine). The contents were stirred for 3 hours at 150° C., cooled to 100° C., then heated again to 150° C., subjected to stripping under a reduced pressure, and cooled to room temperature to obtain a colorless transparent and sticky crude rubber-like substance. Viscosity of a 20 wt. % toluene solution of this substance was 169 mPa·s, and the content of vinyl groups was 0.08 wt. %. Results of NMR analysis showed that the obtained crude resin substance comprised a branched methylvinylpolysiloxane represented by the following average molecular formula (10):

$$[ViMe_2SiO_{1/2}]_4(Me_2SiO_{2/2})_{4000}(ViMeSiO_{2/2})_4 (SiO_{4/2}) \tag{10}$$

Synthesis Example 4

A 5-liter separable flask equipped with a stirrer, thermometer, and a filling mouth was filled with the following components: 145 g of a liquid methylvinylpolysiloxane represented by the following average molecular formula (8): $[ViMe_2SiO_{1/2}]_4(Me_3SiO)_{160}(SiO_{4/2})$ synthesized in Synthesis Example 1; 1677 g of an octamethyl cyclotetrasiloxane; and 0.09 g (50 ppm) of a linear polyaminophosphazenium hydroxide-type catalyst $[Py_3\text{-}N\text{---}(P\text{=}NPy_2)_{1.8}\text{---}PPy_3]^+OH^-$ (where Py stands for pyrrolidine). The contents were stirred for 3 hours at 150° C., cooled to 100° C., then heated again to 150° C., subjected to stripping under a reduced pressure, and cooled to room temperature to obtain a colorless transparent and sticky crude rubber-like substance. Viscosity of a 20 wt. % toluene solution of this substance was 34 mPa·s, and the content of vinyl groups was 0.08 wt. %.

Results of NMR analysis showed that the obtained crude resin substance comprised a branched methylvinylpolysiloxane represented by the following average molecular formula (11):

$$(ViMe_2SiO_{1/2})_4(Me_2SiO_{2/2})_{2000}(SiO_{4/2}) \tag{11}$$

Synthesis Example 5

A 5-liter separable flask equipped with a stirrer, thermometer, and a filling mouth was filled with the following components: 120 g of a liquid methylvinylpolysiloxane represented by the following average molecular formula (8): $[ViMe_2SiO_{1/2}]_4(Me_2SiO)_{160}(SiO_{4/2})$ synthesized in Synthesis Example 1; 480 g of an octamethyl cyclotetrasiloxane; and 0.96 g of tetramethyl ammonium hydroxide (TMAH). The contents were stirred for 5 hours at 85° C., then heated to 150° C., subjected to stripping under a reduced pressure, and cooled to room temperature to obtain a colorless transparent and sticky liquid substance. Viscosity of a 20 wt. % toluene solution of this substance was 9.4 mPa·s, and the content of vinyl groups was 0.2 wt. %.

Results of NMR analysis showed that the obtained liquid substance comprised a branched methylvinylpolysiloxane represented by the following average molecular formula (12):

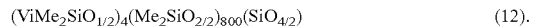

$$(ViMe_2SiO_{1/2})_4(Me_2SiO_{2/2})_{800}(SiO_{4/2}) \tag{12}$$

Synthesis Example 6

A reactor filled with gaseous nitrogen was loaded with 21.6 g of $[Vi(Me)_2SiO_{1/2}]_4SiO_{4/2}$ and 740 g of an octamethyl cyclotetrasiloxane, and the dissolved carbon dioxide was removed by heating to 100° C. and reducing the pressure. Following this, the contents were heated to 150° C. and combined with a catalytic quantity (50 ppm) of a linear polyaminophosphazenium hydroxide-type catalyst: $[Py_3\text{-}N\text{---}(P\text{=}NPy_2)_{1.8}\text{---}PPy_3)^+OH^-$ (where Py stands for pyrrolidine). The contents were stirred for 1 min. and were neutralized, volatile components were removed, the remaining contents were cooled to room temperature to obtain a colorless transparent liquid. Viscosity of a 20 wt. % toluene solution of this liquid was 4.5 mPa·s, and the content of vinyl groups was 0.8 wt. %. Results of NMR analysis showed that the obtained liquid comprised a branched methylvinylpolysiloxane represented by the following average molecular formula (13):

$$(ViMe_2SiO_{1/2})_4(Me_2SiO_{2/2})_{200}(SiO_{4/2}) \tag{13}$$

Practical Example 1

A solution containing 70 wt. % of organopolysiloxane components was prepared by mixing the following components in a mixer: 49.0 parts by weight of the branched methylvinylpolysiloxane (component (A)) synthesized in Synthesis Example 2, containing 0.04 wt. % of vinyl groups, and represented by the following average molecular formula (9): $[ViMe_2SiO_{1/2}]_4(Me_2SiO_{2/2})_{4000}(SiO_{4/2})$; 30 parts by weight of a xylene solution that contains 70.0 wt. % (dry solids content) of a methylpolysiloxane resin (component (B)) composed of $Me_3SiO_{1/2}$ units and $SiO_{4/2}$ units with a 0.8:1 mole ratio of $Me_3SiO_{1/2}$ units to $SiO_{4/2}$ units; 0.22 parts by weight of 1-ethynyl-1-cyclohexanol; 2.31 parts by weight of xylene; and 18.5 parts by weight of toluene.

The obtained solution was further combined with 1.7 parts by weight of a dimethylsiloxane-methylhydrogensiloxane copolymer capped at both molecular terminals with trimethylsiloxy groups (viscosity: 100 cSt (about 100 mPa·s), content of silicon-bonded hydrogen atoms: 1.0 wt. %) (component (C)); a 1,3-divinyl-1,1,3,3-tetramethyldisiloxane complex of platinum (component (D)) added in such an amount that the content of metallic platinum in the aforementioned complex was 100 ppm per total weight of components (A) through (C); and 40 parts by weight of toluene. Mixing of the above components with the aforementioned solution produced a silicone-based pressure-sensitive adhesive composition (SiH/SiVi=33.5) having the organopolysiloxane components in an amount of 50 wt. %. The obtained composition was measured with regard to viscosity and used for manufacturing an adhesive tape. The produced adhesive tape was evaluated with regard to the adhesive force, residual adhesive-remaining property and silicone-transfer property. The results are shown in Table 2.

Practical Example 2

A solution containing 60 wt. % of organopolysiloxane components was prepared by mixing the following components in a mixer: 42.0 parts by weight of the branched methylvinylpolysiloxane (component (A)) synthesized in Synthesis Example 3, containing 0.08 wt. % of vinyl groups, and represented by the following average molecular formula (10): [[ViMe$_2$SiO$_{1/2}$]$_4$ (Me$_2$SiO$_{2/2}$)$_{4000}$(ViMeSiO$_{2/2}$)$_6$(SiO$_{4/2}$); 25.7 parts by weight of a xylene solution that contains 70.0 wt. % (dry solids content) of a methylpolysiloxane resin (component (B)) composed of Me$_3$SiO$_{1/2}$ units and SiO$_{4/2}$ units with a 0.8:1 mole ratio of Me$_3$SiO$_{1/2}$ units to SiO$_{4/2}$ units; 0.20 parts by weight of 1-ethynyl-1-cyclohexanol; 2.0 parts by weight of xylene; and 30.2 parts by weight of toluene.

The obtained solution was further combined with 1.7 parts by weight of a dimethylsiloxane•methylhydrogensiloxane copolymer capped at both molecular terminals with trimethylsiloxy groups (viscosity: 100 cSt (about 100 mPa·s), content of silicon-bonded hydrogen atoms: 1.0 wt. %) (component (C)); a 1,3-divinyl-1,1,3,3-tetramethyldisiloxane complex of platinum (component (D)) added in such an amount that the content of metallic platinum in the aforementioned complex was 100 ppm per total weight of components (A) through (C); and 20 parts by weight of toluene. Mixing of the above components with the aforementioned solution produced a silicone-based pressure-sensitive adhesive composition (SiH/SiVi=22.8) having the organopolysiloxane components in an amount of 50 wt. %. The obtained composition was measured with regard to viscosity, and used for manufacturing an adhesive tape. The produced adhesive tape was evaluated with regard to the adhesive force, residual adhesive-remaining property and silicone-transfer property. The results are shown in Table 2.

Practical Example 3

A solution containing 70 wt. % of organopolysiloxane components was prepared by mixing the following components in a mixer: 29.0 parts by weight of the branched methylvinylpolysiloxane (component (A)) synthesized in Synthesis Example 4 and represented by the following average molecular formula (11): (ViMe$_2$SiO$_{1/2}$)$_4$(Me$_2$SiO$_{2/2}$)$_{2000}$(SiO$_{4/2}$); 30 parts by weight of a xylene solution that contains 70.0 wt. % (dry solids content) of a methylpolysiloxane resin (component (B)) composed of Me$_3$SiO$_{1/2}$ units and SiO$_{4/2}$ units with a 0.8:1 mole ratio of Me$_3$SiO$_{1/2}$ units to SiO$_{4/2}$ units; 0.22 parts by weight of 1-ethynyl-1-cyclohexanol; and 40.8 parts by weight of toluene.

The obtained solution was further combined with 1.7 parts by weight of a dimethylsiloxane•methylhydrogensiloxane copolymer capped at both molecular terminals with trimethylsiloxy groups (viscosity: 100 cSt (about 100 mPa·s), content of silicon-bonded hydrogen atoms: 1.0 wt. %) (component (C)); a 1,3-divinyl-1,1,3,3-tetramethyldisiloxane complex of platinum (component (D)) added in such an amount that the content of metallic platinum in the aforementioned complex was 100 ppm per total weight of components (A) through (C); and 40 parts by weight of toluene. Mixing of the above components with the aforementioned solution produced a silicone-based pressure-sensitive adhesive composition (SiH/SiVi=32.3) having the organopolysiloxane components in an amount of 50 wt. %. The obtained composition was measured with regard to viscosity and used for manufacturing an adhesive tape. The produced adhesive tape was evaluated with regard to the adhesive force, residual adhesive-remaining property, and silicone-transfer property. The results are shown in Table 2.

Comparative Example 1

A solution containing 40 wt. % of organopolysiloxane components was prepared by mixing the following components in a mixer: 35.0 parts by weight of a dimethylpolysiloxane gum having both molecular terminals capped with dimethylvinylsiloxy groups (vinyl-group content: 0.02 wt. %; average degree of polymerization: 4,000); 21.4 parts by weight of a xylene solution that contains 70.0 wt. % (dry solids content) of a methylpolysiloxane resin (component (B)) composed of Me$_3$SiO$_{1/2}$ units and SiO$_{4/2}$ units with a 0.8:1 mole ratio of Me$_3$SiO$_{1/2}$ units to SiO$_{4/2}$ units; 0.20 parts by weight of 1-ethynyl-1-cyclohexanol; 1.65 parts by weight of xylene; and 66.7 parts by weight of toluene.

The obtained solution was further combined with 1.2 parts by weight of a dimethylsiloxane•methylhydrogensiloxane copolymer capped at both molecular terminals with trimethylsiloxy groups (viscosity: 100 cSt (about 100 mPa·s), content of silicon-bonded hydrogen atoms: 1.0 wt. %) (component (C)); a 1,3-divinyl-1,1,3,3-tetramethyldisiloxane complex of platinum (component (D)) added in such an amount that the content of metallic platinum in the aforementioned complex was 100 ppm per total weight of components (A) through (C); and 25 parts by weight of toluene. Mixing of the above components with the aforementioned solution produced a silicone-based pressure-sensitive adhesive composition (SiH/SiVi=115.7) having the organopolysiloxane component in an amount of 33 wt. %. The obtained composition was t measured with regard to viscosity and used for manufacturing an adhesive tape. The produced adhesive tape was evaluated with regard to the adhesive force, residual adhesive-remaining property, and silicone-transfer property. The results are shown in Table 2.

Comparative Example 2

A silicone-based pressure-sensitive adhesive composition (SiH/SiVi=12.2) was produced under the same conditions as in Comparative Example 1, with the exception that the dimethylpolysiloxane gum having both molecular terminals capped with dimethylvinylsiloxy groups was replaced by 35 parts by weight of a dimethylsiloxane•methylvinylsiloxane copolymer gum having both molecular terminals capped with dimethylvinylsiloxy groups (content of vinyl groups: 0.19 wt. %; average degree of polymerization: 4,000). The obtained composition was measured with regard to viscosity and used for manufacturing an adhesive tape. The produced adhesive tape was evaluated with regard to the adhesive force, residual adhesive-remaining property, and silicone-transfer property. The results are shown in Table 2.

Comparative Example 3

A solution containing 40 wt. % of organopolysiloxane components was prepared by mixing the following components in a mixer: 31.0 parts by weight of a dimethylsiloxane•methylvinylsiloxane copolymer gum having both molecular terminals capped with dimethylvinylsiloxy groups (vinyl-group content: 0.37 wt. %; average degree of polymerization: 4000); 27.1 parts by weight of a xylene solution that contains 70.0 wt. % (dry solids content) of a methylpolysiloxane resin (component (B)) composed of units $Me_3SiO_{1/2}$ and $SiO_{4/2}$ with a 0.8:1 mole ratio of $Me_3SiO_{1/2}$ units to $SiO_{4/2}$ units; 0.20 parts by weight of 1-ethynyl-1-cyclohexanol; 2.08 parts by weight of xylene; and 38.8 parts by weight of toluene.

The obtained solution was further combined with 1.2 parts by weight of a dimethylsiloxane•methylhydrogensiloxane copolymer capped at both molecular terminals with trimethylsiloxy groups (viscosity: 100 cSt (about 100 mPa·s), content of silicon-bonded hydrogen atoms: 1.0 wt. %) (component (C)); a 1,3-divinyl-1,1,3,3-tetramethyldisiloxane complex of platinum (component (D)) added in such an amount that the content of metallic platinum in the aforementioned complex was 100 ppm per total weight of components (A) through (C); and 50 parts by weight of toluene. Mixing of the above components with the aforementioned solution produced a silicone-based pressure-sensitive adhesive composition (SiH/SiVi=7.0) having the organopolysiloxane component in an amount of 33 wt. %. The obtained composition was measured with regard to viscosity and used for manufacturing an adhesive tape. The produced tape was evaluated with regard to the adhesive force, residual adhesive-remaining property, and silicone-transfer property. The results are shown in Table 2.

Comparative Example 4

A mixer was loaded with 42.0 parts by weight of a branched methylvinylpolysiloxane of the following average molecular formula (13): $(ViMe_2SiO_{1/2})_4(Me_2SiO_{2/2})_{200}(SiO_{4/2})$ having 0.70 wt. % content of vinyl groups and synthesized in Synthesis Example 6 and 25.7 parts by weight of a xylene solution of containing 70.0 wt. % (dry solids content) of a methylpolysiloxane resin (component (B)) composed of $Me_3SiO_{1/2}$ units and $SiO_{4/2}$ units with a 0.8:1 mole ratio of $Me_3SiO_{1/2}$ units to $SiO_{4/2}$ units. After sufficient stirring at room temperature, the product was stripped for 2 hours at 150° C., whereby xylene was removed.

The product was cooled to room temperature, and 50 parts by weight of the obtained solvent-free mixture were further combined and mixed with 0.6 parts by weight of a dimethylsiloxane methylhydrogensiloxane copolymer capped at both molecular terminals with trimethylsiloxy groups (viscosity: 100 cSt (about 100 mPa·s), content of silicon-bonded hydrogen atoms: 1.0 wt. %) (component (C)); a 1,3-divinyl-1,1,3,3-tetramethyldisiloxane complex of platinum (component (D)) added in such an amount that the content of metallic platinum in the aforementioned complex was 100 ppm per total weight of components (A) through (C); and 0.2 parts by weight of 1-ethynyl-1-cyclohexanol, whereby a solvent-free silicone-based pressure-sensitive adhesive composition (SiH/SiVi=1.1) was obtained. The obtained composition was measured with regard to viscosity and used for manufacturing an adhesive tape. The produced tape was evaluated with regard to the adhesive force, residual adhesive-remaining property, and silicone-transfer property. The results are shown in Table 3.

It has been turned out that the silicone-based pressure-sensitive adhesive composition comprising the branched methylvinylpolysiloxane represented by the molecular formula (3) wherein m is equal to 200, namely, the branched methylvinylpolysiloxane comprising 200 $Me_2SiO_{2/2}$ units has poor pressure-sensitive adhesive properties.

Comparative Example 5

A silicone-based pressure-sensitive adhesive composition (SiH/SiVi=2.2) was produced under the same conditions as in Comparative Example 4, with the exception that 1.2 parts by weight of the dimethylsiloxane•methylhydrogensiloxane copolymer capped at both molecular terminals with trimethylsiloxy groups were used. The obtained silicone-based pressure-sensitive adhesive composition was measured with regard to viscosity and used for manufacturing an adhesive tape. The produced tape was evaluated with regard to the adhesive force and silicone-transfer properties. The results are shown in Table 3.

It has been turned out that the silicone-based pressure-sensitive adhesive composition comprising the branched methylvinylpolysiloxane represented by the molecular formula (3) wherein m is equal to 200, namely, the branched methylvinylpolysiloxane comprising 200 $Me_2SiO_{2/2}$ units has poor pressure-sensitive adhesive properties.

Comparative Example 6

A silicone-based pressure-sensitive adhesive composition (SiH/SiVi=4.4) was produced under the same conditions as in Comparative Example 4, with the exception that 2.4 parts by weight of the dimethylsiloxane•methylhydrogensiloxane copolymer capped at both molecular terminals with trimethylsiloxy groups were used. The obtained silicone-based pressure-sensitive adhesive composition was measured with regard to viscosity and used for manufacturing an adhesive tape. The produced adhesive tape was evaluated with regard to the adhesive force, residual adhesive-remaining property, and silicone-transfer property. The results are shown in Table 3.

It has been turned out that the silicone-based pressure-sensitive adhesive composition comprising the branched methylvinylpolysiloxane represented by the molecular formula (3) wherein m is equal to 200, namely, the branched methylvinylpolysiloxane comprising 200 $Me_2SiO_{2/2}$ units has poor pressure-sensitive adhesive properties.

Comparative Example 7

A mixer was loaded with 24.0 parts by weight of a branched methylvinylpolysiloxane of the following average molecular formula (13): $(ViMe_2SiO_{1/2})_4$ $(Me_2SiO_{2/2})_{200}(SiO_{4/2})$ having 0.70 wt. % content of vinyl groups and synthesized in Synthesis Example 6 and 51.4 parts by weight of a xylene solution of containing 70.0 wt. % (dry solids content) of a methylpolysiloxane resin (component (B)) composed of $Me_3SiO_{1/2}$ units and $SiO_{4/2}$ units with a 0.8:1 mole ratio of $Me_3SiO_{1/2}$ units to $SiO_{4/2}$ units. After sufficient stirring at room temperature, the mixture was stripped for 2 hours at 150° C., whereby xylene contained in component (B) was removed.

It was impossible to measure any viscosity and to prepare any solventless pressure-sensitive adhesive composition, since the resulting mixture containing no xylene was solid. This mixture containing no xylene has the same mixing ratio of the branched methylvinylpolysiloxane represented by the average molecular formula (13) to the methylpolysiloxane resin as the mixing ratio of the branched vinyl-containing polydimethylsiloxane represented by the average molecular formula: $(ViMe_2SiO_{1/2})_4$ $(Me_2SiO_{2/2})_{200}(MeSiO_{4/2})_1$ wherein the alkenyl content is 0.026 moles/100 grams and the viscosity is 360 mPa·s contained in the solventless adhesive in Practical Example 6 of Patent Reference 6 (A-3) to the polyorganosiloxane (C). The $MeSiO_{4/2}$ unit is theoretically impossible. It is believed that said unit is clerical error, and is rather $MeSiO_{3/2}$ unit. The reason why the resulting mixture containing no xylene was solid is that the branched methylvinylpolysiloxane represented by the average molecular formula (13) does not comprise the $MeSiO_{3/2}$ unit, but comprises $SiO_{4/2}$ units.

Comparative Example 8

A mixer was loaded with 62.0 parts by weight of a branched methylvinylpolysiloxane of the following average molecular formula (12): $(ViMe_2SiO_{1/2})_4(Me_2SiO)_{800}(SiO_{4/2})$ having 0.31 wt. % content of vinyl groups and synthesized in Synthesis Example 5 and 38.0 parts by weight of a xylene solution containing 70.0 wt. % (dry solids content) of a methylpolysiloxane resin (component (B)) composed of $Me_3SiO_{1/2}$ units and $SiO_{4/2}$ units with a 0.8:1 mole ratio of $Me_3SiO_{1/2}$ units to $SiO_{4/2}$ units. The components were stirred at room temperature.

It has been turned out that the silicone-based pressure-sensitive adhesive composition comprising the branched methylvinylpolysiloxane represented by the molecular formula (3) wherein m is equal to 800, namely, the branched methylvinylpolysiloxane comprising 800 $Me_2SiO_{2/2}$ units has poor pressure-sensitive adhesive properties.

The mixture was further combined with 1.06 parts by weight of a dimethylsiloxane·methylhydrogensiloxane copolymer capped at both molecular terminals with trimethylsiloxy groups (viscosity: 100 cSt (about 100 mPa·s), content of silicon-bonded hydrogen atoms: 1.0 wt. %) (component (C)); a 1,3-divinyl-1,1,3,3-tetramethyldisiloxane complex of platinum (component (D)) added in such an amount that the content of metallic platinum in the aforementioned complex was 180 ppm per total weight of components (A) through (C); and 0.36 parts by weight of 1-ethynyl-1-cyclohexanol, whereby a silicone-based pressure-sensitive adhesive composition (SiH/SiVi=1.7) having the organopolysiloxane components in an amount of 89 wt. % was obtained. The obtained composition was measured with regard to viscosity and used for manufacturing an adhesive tape. The produced tape was evaluated with regard to the adhesive force, residual adhesive-remaining property, and silicone-transfer property. The results are shown in Table 3.

Comparative Example 9

A mixer was loaded with 40.0 parts by weight of a branched methylvinylpolysiloxane of the following average molecular formula (12): $(ViMe_2SiO_{1/2})_4(Me_2SiO)_{800}(SiO_{4/2})$ having 0.31 wt. % content of vinyl groups and synthesized in Synthesis Example 5 and 85.7 parts by weight of a xylene solution containing 70.0 wt. % (dry solids content) of a methylpolysiloxane resin (component (B)) composed of $Me_3SiO_{1/2}$ units and $SiO_{4/2}$ units with a 0.8:1 mole ratio of $Me_3SiO_{1/2}$ units to $SiO_{4/2}$ units. The components were stirred at room temperature.

The mixture was further combined with 1.06 parts by weight of a dimethylsiloxane·methylhydrogensiloxane copolymer capped at both molecular terminals with trimethylsiloxy groups (viscosity: 100 cSt (about 100 mPa·s), content of silicon-bonded hydrogen atoms: 1.0 wt. %) (component (C)); a 1,3-divinyl-1,1,3,3-tetramethyldisiloxane complex of platinum (component (D)) added in such an amount that the content of metallic platinum in the aforementioned complex was 180 ppm per total weight of components (A) through (C); and 0.36 parts by weight of 1-ethynyl-1-cyclohexanol, whereby a silicone-based pressure-sensitive adhesive composition (SiH/SiVi=2.6) having the organopolysiloxane components in an amount of 89 wt. % was obtained. The obtained composition was measured with regard to viscosity and used for manufacturing an adhesive tape. The produced adhesive tape was evaluated with regard to the adhesive force, residual adhesive-remaining property, and silicone-transfer property. The results are shown in Table 3. It has been turned out that the silicone-based pressure-sensitive adhesive composition comprising the branched methylvinylpolysiloxane represented by the molecular formula (3) wherein m is equal to 800, namely, the branched methylvinylpolysiloxane comprising 800 $Me_2SiO_{2/2}$ units has poor pressure-sensitive adhesive properties.

TABLE 2

| | | Practical Examples | | | Comparative Examples | | |
|---|---|---|---|---|---|---|---|
| | | 1 | 2 | 3 | 1 | 2 | 3 |
| Content of organopolysiloxane (%) | | 70 | 60 | 60 | 40 | 40 | 50 |
| Viscosity (mPa·s) | | 35,000 | 11,000 | 4,000 | 30,000 | 30,000 | 40,000 |
| Adhesive force (g/20 mm) | | 26 | 10 | 56 | 65 | 6 | 10 |
| Residual adhesive-remaining property | Mirror-surface SUS plate | ◯ | ◯ | ◯ | ◯ | ◯ | AF |
| | Gold-plated plate | ◯ | ◯ | Δ | ◯ | ◯ | ◯ |

TABLE 2-continued

|  |  | Practical Examples | | | Comparative Examples | | |
| --- | --- | --- | --- | --- | --- | --- | --- |
|  |  | 1 | 2 | 3 | 1 | 2 | 3 |
| Silicone-transfer property | Mirror-surface SUS plate | ○ | ○ | ○~Δ | X | ○ | AF |
|  | Gold-plated plate | ○~Δ | ○ | X | X | Δ~X | X |

TABLE 3

|  |  | Comparative Examples | | | | | |
| --- | --- | --- | --- | --- | --- | --- | --- |
|  |  | 4 | 5 | 6 | 7 | 8 | 9 |
| Content of organopoly-siloxane (%) |  | 100 | 100 | 100 | 100 | 89 | 89 |
| Viscosity (mPa · s) |  | 1000 | 1000 | 1000 |  | 2000 | 1630 |
| Adhesive force (g/20 mm) |  | 2 | 2 | 2 | N/A | 5 | 350 |
| Residual adhesive-remaining property | Mirror-surface SUS plate | AF | X | ○ | N/A | ○ | AF |
|  | Gold-plated plate | ○ | ○ | ○ | N/A | ○ | ○ |
| Silicone-transfer property | Mirror-surface SUS plate | AF | X | V, X | N/A | ○ | AF |
|  | Gold-plated plate | X | X | X | N/A | X | X |

[Residual Adhesive-Remaining Property]
(Meaning of Symbols Used in the Tables)
○: No traces of the residual adhesive are observed.
Δ: Some traces of the residual adhesive are observed.
x: Clearly visible residual adhesive are observed.
AF: Insufficiently tight adhesion to a PI film. The entire cured film remains on the adherend.
V: Voids are formed between the pressure-sensitive layer and the substrate because of the low adhesive force.
N/A: It is impossible to prepare any solventless pressure-sensitive adhesive composition.
[Silicone-Transfer Property]
○: No traces of the silicone-transfer are observed.
Δ: Some traces of the silicone-transfer are observed
x: Clearly visible silicone-transfer is observed.
AF: Insufficiently tight adhesion to a PI film. The entire cured film remains on the adherend.
V: Voids are formed between the pressure-sensitive layer and the substrate because of the low adhesive force.
N/A: It is impossible to prepare any solventless pressure-sensitive adhesive composition.

Since the pressure-sensitive compositions of Practical Examples 1 and 2 develop appropriate adhesive forces and do not leave the residual adhesives and do not transfer silicone to the surface of the adherend, these compositions are suitable for manufacturing masking tapes of high-temperature application. The composition of Practical Example 3 leaves the residual adhesives on the surface of the adherend and transfers silicone to the surface of the adherend within the practically allowable limits. This composition is suitable for manufacturing masking tapes on areas that require strong adhesion.

The pressure-sensitive adhesive compositions of all comparative examples are characterized by "too low adhesive force", noticeable residual adhesives or noticeable silicone-transfer, impossibility to prepare any solventless pressure-sensitive adhesive composition, or by a combination of the aforementioned drawbacks. Therefore, these compositions are not suitable for practical application.

INDUSTRIAL APPLICABILITY

The silicone-based pressure-sensitive adhesive composition is useful for forming pressure-sensitive adhesive layers on the surfaces of pressure-sensitive adhesive tapes or sheets.

The adhesive tapes or sheets of the present invention are useful as masking tapes or sheets, for metal substances, ceramic substances, electronic circuit boards, or similar objects operating at high temperatures. In particular, the adhesive tapes of the present invention are very useful as masking tapes for solder reflow processes on electronic circuit boards.

The invention claimed is:
1. A silicone-based pressure-sensitive adhesive composition comprising:
100 parts by weight of (A) a branched organopolysiloxane having on average at least two alkenyl groups on molecular terminals and represented by the following molecular formula (1):

$$(R_3SiO_{1/2})_{4-p}(R^1R_2SiO_{1/2})_p(R_2SiO)_m(RR^1SiO)_n(SiO_{4/2}) \quad (1)$$

(wherein R designates a monovalent hydrocarbon group or a monovalent halogenated hydrocarbon group which is free of unsaturated aliphatic bonds and has 1 to 10 carbon atoms; $R^1$ designates an alkenyl group having 2 to 10 carbon atoms; "p" is a number which on average is in the range of 2 to 4; "m" is a number which on average is in the range of 1,500 to 10,000;

"n" is a number which on average is equal to or greater than 0; and m>n, and (m+n) on average is in the range of 1,500 to 10,000);

10 to 400 parts by weight of (B) an organopolysiloxane resin composed of $R^3R^2{}_2SiO_{1/2}$ units (where $R^2$ designates an alkyl group with 1 to 10 carbon atoms, $R^3$ designates an alkyl group with 1 to 10 carbon atoms, an alkenyl group with 2 to 10 carbon atoms, an aryl group with 6 to 10 carbon atoms or a hydroxyl group) and $SiO_{4/2}$ units, where the mole ratio of the $R^3R^2{}_2SiO_{1/2}$ units to $SiO_{4/2}$ units ranges from 0.6 to 1.7;

(C) an organohydrogenpolysiloxane having in one molecule two or more silicon-bonded hydrogen atoms, which is used in an amount sufficient to provide a mole ratio of silicon-bonded hydrogen atoms of this component to alkenyl groups contained in components (A) and (B) in the range of 1.0 to 60; and (D) a catalytic quantity of a platinum-type catalyst.

2. The silicone-based pressure-sensitive adhesive composition according to claim 1, wherein "n" and "m" in the formula (1) of component (A) satisfy the following condition: $0 \leq n/(m+n) \leq 0.03$.

3. The silicone-based pressure-sensitive adhesive composition according to claim 1, wherein molecular formula (1) of component (A) is represented by the following formula (2):

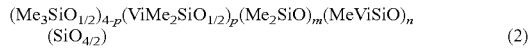
$$(Me_3SiO_{1/2})_{4-p}(ViMe_2SiO_{1/2})_p(Me_2SiO)_m(MeViSiO)_n(SiO_{4/2}) \quad (2)$$

(wherein Me designates a methyl group; Vi designates a vinyl group; "p" is a number which on average is in the range of 2 to 4; "m" is a number which on average is in the range of 1,500 to 10,000; "n" is a number which on average is equal to or greater than 0; and m>n, and (m+n) on average is in the range of 1,500 to 10,000); $R^3R^2{}_2SiO_{1/2}$ units of component (B) are $Me_3SiO_{1/2}$ units; and component (C) is a methylhydrogenpolysiloxane.

4. The silicone-based pressure-sensitive adhesive composition of claim 3, wherein molecular formula (2) of component (A) is represented by the following molecular formula (3):

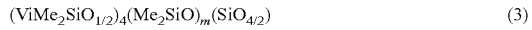
$$(ViMe_2SiO_{1/2})_4(Me_2SiO)_m(SiO_{4/2}) \quad (3)$$

(where Me designates a methyl group, Vi designates a vinyl group, and "m" is a number which on average is in the range of 1,500 to 10,000).

5. The silicone-based pressure-sensitive adhesive composition of claim 1, further comprising (E) an organic solvent in a sufficient amount to provide the total weight of components (A) through (D) which is equal to or greater than 30 wt. % but less than 100 wt. % of the composition.

6. The silicone-based pressure-sensitive adhesive composition according to claim 5, wherein "n" and "m" in the formula (1) of component (A) satisfy the following condition: $0 \leq n/(m+n) \leq 0.03$.

7. The silicone-based pressure-sensitive adhesive composition according to claim 5, wherein molecular formula (1) of component (A) is represented by the following formula (2):

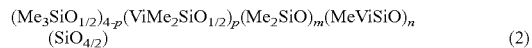
$$(Me_3SiO_{1/2})_{4-p}(ViMe_2SiO_{1/2})_p(Me_2SiO)_m(MeViSiO)_n(SiO_{4/2}) \quad (2)$$

(wherein Me designates a methyl group; Vi designates a vinyl group; "p" is a number which on average is in the range of 2 to 4; "m" is a number which on average is in the range of 1,500 to 10,000; "n" is a number which on average is equal to or greater than 0; and m>n, and (m+n) on average is in the range of 1,500 to 10,000); $R^3R^2{}_2SiO_{1/2}$ units of component (B) are $Me_3SiO_{1/2}$ units; and component (C) is a methylhydrogenpolysiloxane.

8. The silicone-based pressure-sensitive adhesive composition of claim 7, wherein molecular formula (2) of component (A) is represented by the following molecular formula (3):

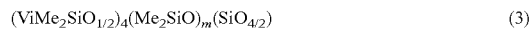
$$(ViMe_2SiO_{1/2})_4(Me_2SiO)_m(SiO_{4/2}) \quad (3)$$

(where Me designates a methyl group, Vi designates a vinyl group, and "m" is a number which on average is in the range of 1,500 to 10,000).

9. A pressure-sensitive adhesive tape or sheet comprising a tape or sheet substrate, and a pressure-sensitive adhesive layer in the form of a cured body of the silicone-based pressure-sensitive adhesive composition as claimed in claim 1 formed on the surface of the tape or sheet substrate.

10. The silicone-based pressure-sensitive adhesive composition according to claim 1, wherein "p" in the formula (1) of component (A) on average is 3 to 4.

11. The silicone-based pressure-sensitive adhesive composition according to claim 1, wherein "m" in the formula (1) of component (A) ranges on average from 3,000 to 6,000.

\* \* \* \* \*